Sept. 4, 1962     W. H. BATEMAN     3,052,461

WORK-PIECE CLAMPING MEANS

Filed March 21, 1960

United States Patent Office 3,052,461
Patented Sept. 4, 1962

3,052,461
WORK-PIECE CLAMPING MEANS
William Henry Bateman, Overstream Cottage, Overstream, Loudwater, Rickmansworth, England
Filed Mar. 21, 1960, Ser. No. 16,569
Claims priority, application Great Britain Apr. 9, 1959
4 Claims. (Cl. 269—43)

This invention relates to a flexible clamping means for securing in a vice or like holder a work-piece having contoured or flat surfaces, and particularly a flexible sheet metal work-piece which is required to be held during a welding operation.

A clamping means in accordance with the invention consists of a resilient metal strip shaped to an arcuate cross-section and notched along its edges so that it has both transverse and longitudinal flexibility, and also such that under the action of pressure applied to its crown at least one of its edges can adapt itself to the work-piece.

Figure 1:
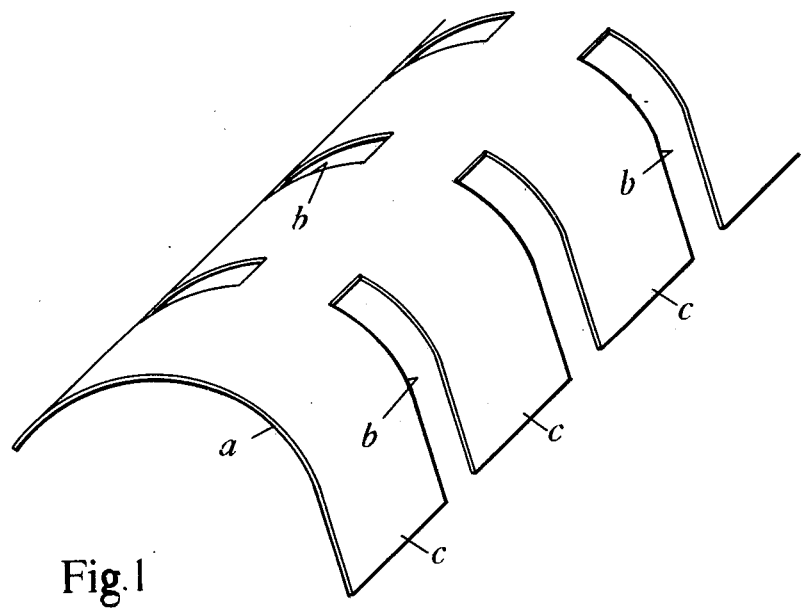
FIGURE 1 is a perspective view of a portion of a resilient clamping strip shaped in accordance with the invention.

Referring to the drawings, the clamping means consists of a resilient metal strip $a$ shaped as shown in FIGURE 1. The strip is made of arcuate cross-section, and along each of its longitudinal edges is formed a number of notches $b$ spaced at an appropriate distance apart, thereby forming a series of fingers $c$. Each notch extends at right angles from the associated edge sufficiently to impart both transverse and longitudinal flexibility to the strip. Each notch may have parallel edges as shown in FIGURE 1, or it may be tapered inwardly from its open end.

Figure 3:
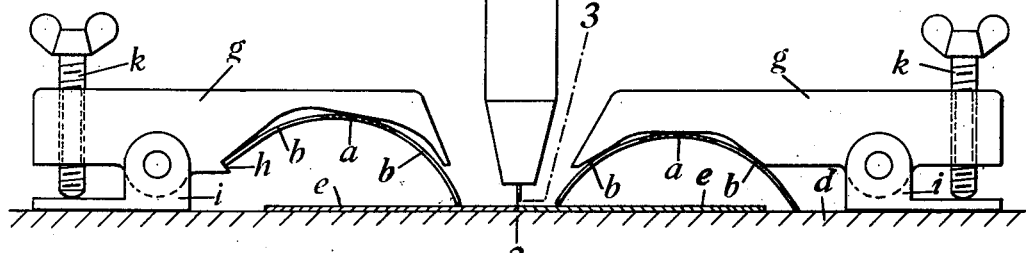
Figure 3:
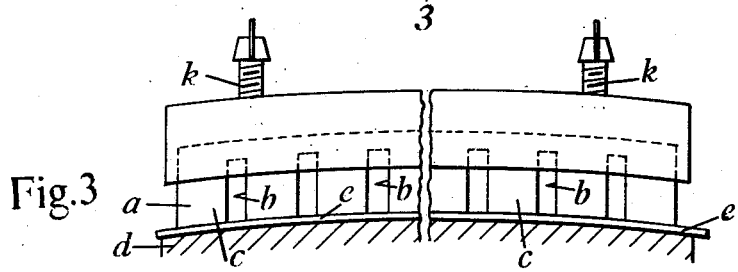

In the example illustrated two such clamping strips as $a$ are required to hold on a fixed support $d$ a pair of metal work sheets $e$ which are required to be welded together along their contiguous edges by an electric torch $f$ for other welding means. The support $d$ in the example illustrated has a convex contour in the direction of the length of the edges of the work sheets to be welded as shown in FIGURE 3. Alternatively the contour may be concave.

Each of the flexible clamping strips is held by a rigid bar $g$ shaped to correspond in the direction of its length to the contour of the support $d$ and adapted to apply pressure to the crown of the strip, and so press at least one edge of the strip into tight contact with the associated work sheet $e$, thereby causing the latter to assume the contour of the support $d$ during the welding operation.

Figure 2:
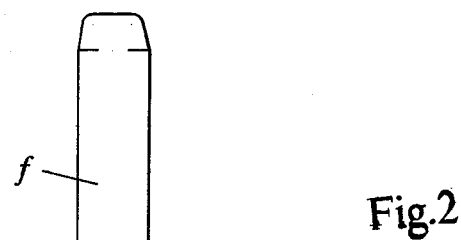
FIGURE 2 is a cross section and FIGURE 3 a longitudinal section on the line 3—3 of FIGURE 2, illustrating a work-piece holder provided with clamping strips in accordance with the invention for holding two metal sheets which are required to be welded together along a pair of contiguous edges.

The clamping strip may co-operate with the associated bar $g$ in either of two ways which are respectively illustrated by the left and right hand portions of FIGURE 2. In the example shown at the left hand portion of FIGURE 2, the bar $g$ has formed on it a narrow ledge $h$ which serves as an abutment for one edge of the clamping strip. In the example shown at the right hand portion of FIGURE 2, one edge of the clamping strip is held in contact with the support $d$. Alternatively both edges of the clamping strip may be arranged in contact with the associated work sheet $e$.

Each bar $g$ is pivotally attached to lugs $i$ on the support $d$ and is actuated by screws $k$. Alternatively any other convenient means may be employed for supporting and actuating the said bars.

Whilst the invention is primarily required for use in securing a pair of contoured work sheets during a welding operation, it may also be employed for other analogous uses in which it is required that the clamping means can accommodate itself to the work-piece. For some purposes, only one flexible strip and clamping bar is required, as for example, when performing a trimming operation on an edge of a metal work sheet. The invention is also advantageously applicable for use between a pair of flat gripping means where it is required to ensure a uniform grip over the whole length of the work-piece.

Having thus described my invention what I claim as new and desire to secure by Letters Patent is:

1. A work-piece holding means comprising an elongated rigid support for a work-piece, a resilient metal strip shaped to an arcuate cross-section with a central crown portion and having a multiplicity of notches in both of its longitudinal edges and transverse and longitudinal flexibility, the notches being spaced apart throughout the length of the strip for enabling at least one of the said edges to adapt itself to the work-piece surface upon the application of pressure to the crown portion of the strip, and means movable against the central crown portion radially thereof to press the at least one of said edges against the work-piece while the other of the edges is in engagement with a rigid surface.

2. A work-piece clamping means according to claim 1, wherein the notches extend equally from both the longitudinal edges of the strip towards the crown portion thereof which has a longitudinal surface untraversed by the notches.

3. A work-piece holding means comprising in combination, an elongated rigid support, for a work piece thereon, bearing parts mounted on said support, rigid bar members respectively pivoted to said bearing parts and arranged for rocking transversely relative to the support, abutment means provided on each bar member at one side of its pivot axis, adjustment means provided at the opposite side of the pivot axis of each bar member for adjustably rocking the same, a resilient metal strip shaped to an arcuate cross-section with a central crown portion between the abutment means and support, the crown being engageable by said abutment means and having a multiplicity of notches in both of its longitudinal edges and transverse and longitudinal flexibility, the notches being spaced apart throughout the length of the strip for enabling at least one of the said edges to adapt itself to the surface of the work-piece extending along the support upon the application of pressure to the crown portion of the strip by said abutment means, the other of the edges being engageable with a rigid surface.

4. A work-piece holding means according to claim 3, wherein each bar member is provided at the same side of its pivot axis as the corresponding abutment means with a ledge which constitutes the surface with which the other of the edges is engageable.

References Cited in the file of this patent

UNITED STATES PATENTS

| 453,983 | Okey | June 9, 1891 |
| 1,251,516 | Hardesty | Jan. 1, 1918 |
| 2,148,563 | Kingsley | Feb. 28, 1939 |
| 2,304,493 | Bullock | Dec. 8, 1942 |
| 2,377,904 | Roach | June 12, 1945 |
| 2,520,435 | Roman | Aug. 29, 1950 |
| 2,693,634 | Nuyett | Nov. 9, 1954 |